May 9, 1944.　　　　E. J. FIEKERS　　　　2,348,287
METHOD OF FORMING COMPOSITE ARTICLES
Filed March 2, 1942
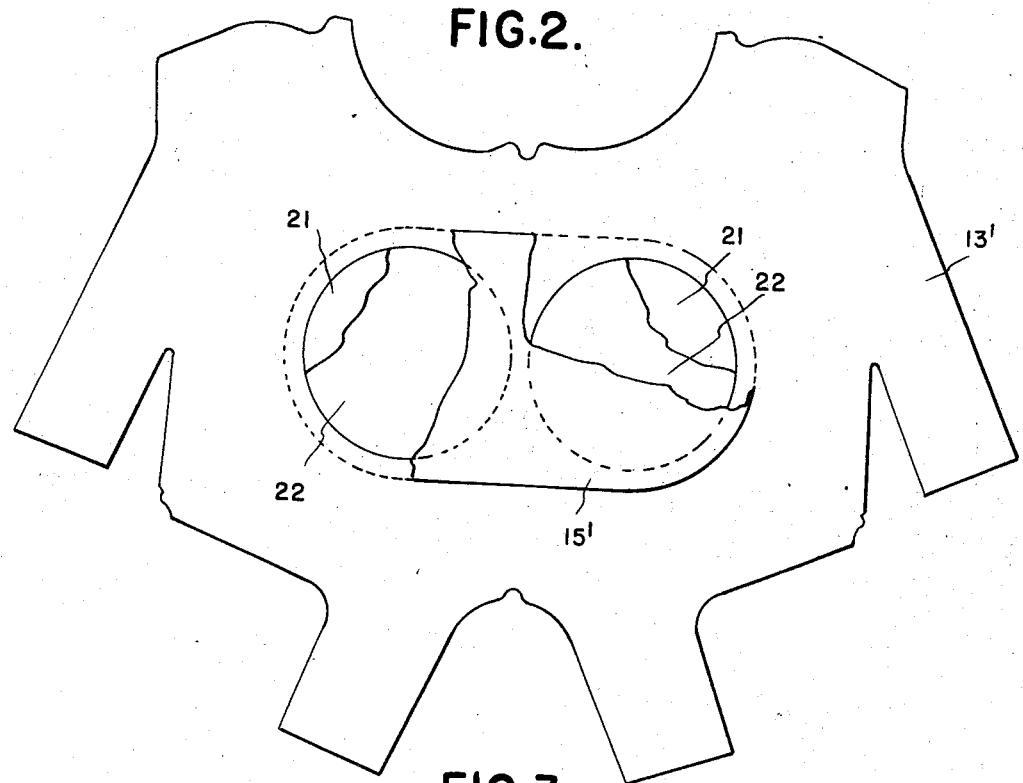
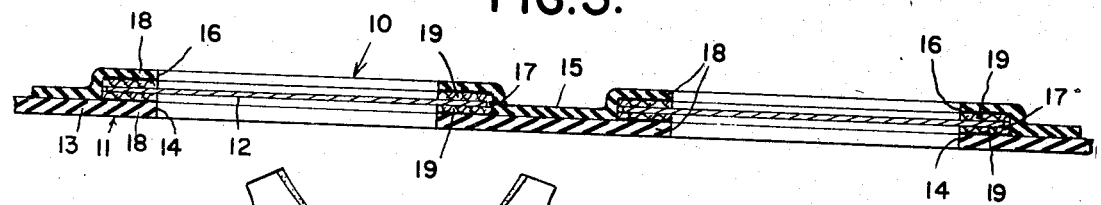
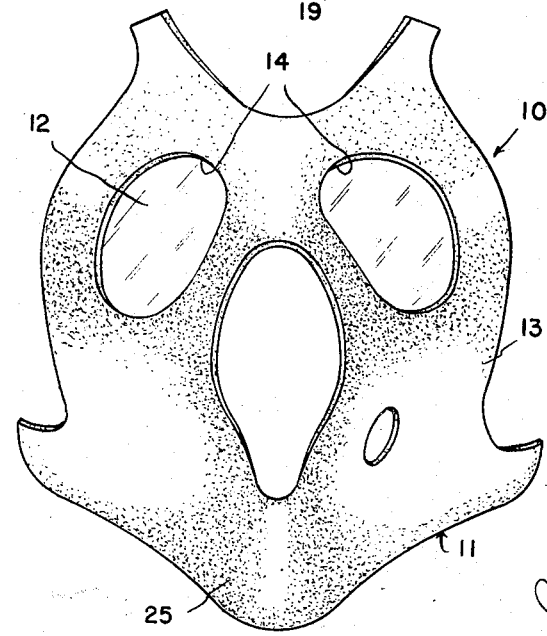
INVENTOR.
EDMUND J. FIEKERS
BY
ATTORNEYS Patented May 9, 1944

2,348,287

UNITED STATES PATENT OFFICE 2,348,287

METHOD OF FORMING COMPOSITE ARTICLES

Edmund J. Fiekers, Pontiac, Mich., assignor to Baldwin Rubber Company, Pontiac, Mich., a corporation of Michigan Application March 2, 1942, Serial No. 433,100

1 Claim. (Cl. 154—2)

This invention relates to composite articles and to an improved method of manufacturing such articles.

Heretofore considerable difficulty has been experienced in manufacturing composite articles where the materials required possess radically different characteristics and where the joint between the dissimilar materials must not only be gas tight but must also remain gas tight when subjected to considerable stress. This problem is particularly critical in cases where, for example, one material is rubber or possesses characteristics similar to rubber and where the other material is a plastic such, for example, as cellulose acetate, acrylic acid esters, vinyl halide or ester polymers. Materials having such radically different characteristics are extremely difficult to bond together and are usually joined by mechanical or some equivalent relatively complicated means which not only requires considerable time in manufacture and assembly but are none too satisfactory in use.

It is one of the principal objects of this invention to integrally connect materials of the above general type without the assistance of mechanical or equivalent means by bonding one material to the other in a manner to provide a gas tight seal therebetween which will withstand considerable stress without breaking down.

In accordance with this invention an absorbent material is applied to one side of a rubber-like member and is coated with one of the solvents for the particular plastic member it is desired to secure to the rubber-like member so that by pressing the plastic member against the surface of absorbent material, the plastic is softened by the solvent sufficiently to penetrate the absorbent surface and bond the plastic member to the rubber-like member.

The above features of this invention are especially applicable to the manufacture of gas masks where the body part of the mask is formed of a rubber-like material which is impervious to moisture or gas and where the windows are formed of a plastic material such as cellulose acetate, acrylic acid esters, vinyl halide or ester polymers.

In connection with the above application of the invention, it is a further object to surround each window opening in the body part with an annular pocket lined with a material possessing the absorbent qualities required to retain the appropriate solvent for the plastic member so that after the peripheral portions of the plastic members are respectively engaged in the pockets and pressure is applied, the plastic member is softened by the solvent material retained in the absorbent material and penetrates the absorbent material to effect a strong gas tight bond around the plastic windows.

Still another object of this invention is to control the flow characteristics of the solvent employed and also the pressure applied so as to prevent displacement of the solvent or the softened plastic material from the pockets.

The foregoing, as well as other objects, will be made more apparent as this description proceeds, especially when considered in connection with the accompanying drawing, wherein:

Figure 1 is a front elevational view of a part of a gas mask embodying the present invention;

Figure 2 is a longitudinal sectional view showing the seals around the windows for the gas mask; and Figure 3 is an elevational view partly broken away and illustrating several steps in the method of manufacturing the gas mask.

Although some or all of the principles of this invention may be advantageously employed in manufacturing numerous different types of composite articles embodying materials having characteristics similar to the specific materials hereinafter described, nevertheless, I have selected a composite article in the form of a gas mask for the purpose of illustrating the invention. With this in view reference is made to the several figures of the drawing wherein the reference character 10 designates generally a gas mask having a body member 11 of the usual shape and having windows 12 located in the body member to insure unobstructed vision of the wearer.

The body member 11 comprises a sheet of flexible material 13 which is impervious to moisture and which is apertured to provide openings 14 for the windows 12. Upon reference to Figure 3, it will be noted that a second sheet of material 15 is secured to the sheet 13 in superimposed relationship to the latter sheet and is provided with openings 16 registering with the openings 14 in the sheet 13.

It will also be noted from Figure 3 that the portions of the sheets 13 and 15 surrounding the openings therethrough cooperate with one another to form an annular pocket or channel 17 around each of the openings. The opposed walls 18 of each annular pocket are lined with an absorbent material 19 and these linings are respectively integrally secured to the inner surfaces of the walls in a manner to be more fully hereinafter described.

The windows 12 are in the form of transparent discs having a diameter greater than the diameter of the registering openings through the sheets of the body member 11 and slightly less than the maximum diameter of the pockets 17. This construction enables the peripheral portions of the windows 12 to extend for a substantial distance into the pockets 17 with the opposite sides thereof contacting the absorbent linings 19. As will be presently set forth, the opposite sides of the peripheral portions of the windows are integrally bonded with the linings 19 on the opposed walls 18 of the pockets in a manner to provide an effective gas tight seal around each window which will maintain its effectiveness over a long period of use and under any normal stresses to which the construction is liable to be subjected to during use or handling.

In the present instance, the windows or discs 12 are formed of a plastic material characterized in that it becomes soft in the presence of a solvent and possesses adhesive qualities. In general, any material having the above characteristics may be used and particularly satisfactory results have been obtained by using a plastic material such, for example, as cellulose acetate, acrylic acid esters, vinyl halide or ester polymers. When using a plastic material of the above general types, various solvents may be employed. I prefer to use any solvent in the ketone class such as acetone. However, various esters may be used such as ethyl acetate, butyl acetate and Cellosolve. Alcohols may be used with some types of plastics but are generally less effective than the ketones. Depending upon the choice of plastic, many different solvents may be used, among which may be aromatic hydrocarbons, chlorinated hydrocarbons, hydrogenated hydrocarbons, etc.

In manufacturing the composite article, I prefer to apply the solvent to the absorbent linings 19 of the opposed walls 18 of the pockets 17 so that when the peripheral portions of the windows 12 are engaged in the pockets, a reaction takes place which softens the peripheral portions of the windows. When the peripheral portions of the windows are softened by the solvent treated linings, they become tacky and a sufficient amount of the plastic material permeates the linings, particularly if pressure is applied, to integrally join the peripheral portions of the windows with the opposed walls of the pockets. Particularly satisfactory results have been obtained by employing a solvent or softener containing approximately 5% by weight of cellulose acetate and approximately 95% by weight of acetone. The cellulose acetate is employed to control the viscosity of the acetone and the proportion of the cellulose acetate used may vary within wide limits depending upon the degree of viscosity desired. In the present instance, the amount of cellulose acetate in the compound is determined to enable the compound to readily permeate the absorbent linings 19 without becoming so thin as to drain or escape from the pockets 17 onto the portions of the windows 12 in the openings 14. It will also be understood that although cellulose acetate is specifically referred to, any material capable of dissolving in the solvent and increasing its viscosity may be used. For example, in the case of acetone, cellulose nitrate, polymerized vinyl halide and many natural or synthetic resins or gums may be used.

The sheet 13 is formed of rubber, synthetic rubber or any material which is impervious to moisture and gas and is capable of being vulcanized. Although the sheet 15 may be formed of the same material as the sheet 13, nevertheless, I prefer to form this sheet from a material having more rigidity than the sheet 13. In detail, the sheet 15 comprises a fabric material calendered on both sides with a rubber material which flows into the interstices of the fabric and forms in effect a rubberized sheet capable of being cemented, vulcanized or otherwise integrally united to the sheet 13.

The linings 19 for the opposed walls 18 of the pockets 17 have the adjacent or inner surfaces formed of absorbent material such, for example, as a suitable fabric and the outer surfaces of the linings are coated with a suitable adhesive material such, for example, as rubber cement. The fabric used in forming the linings is selected for its absorbing qualities and particularly satisfactory results have been obtained by using twill which is napped on one side to prevent bleeding of the rubber stock therethrough during the forming operations. The purpose of the adhesive on the twill is to enable securing the latter in place during the interval the sheet 13 is vulcanized and secured to the sheet 15.

With the above in view reference will now be made to the method of manufacture. In detail, a sheet of uncured vulcanizable material 13' is die cut or otherwise formed to the contour shown in Figure 1 and this sheet is laid flat on a form, not shown, of a suitable vulcanizing press. A pair of discs 21 having a diameter equal to the maximum diameter of the pockets and formed of the lining material, previously described, are respectively supported on the uncured sheet 13' at the proper locations for the windows with the adhesive surfaces of the discs contacting the adjacent surface of the sheet 13'. Similar discs 22 are respectively positioned on the discs 21 with the fabric or absorbent surfaces respectively contacting the corresponding surfaces of the discs 21.

After the discs are properly positioned on the uncured sheet of stock 13', a sheet 15' of the same material as the sheet 15 of the finished product is placed over the discs in the manner indicated in Figure 2. This subassembly is then subjected to sufficient heat to vulcanize the sheet 15' to the sheet 13' and to also vulcanize or cement the discs 21 to the sheet 13' and the discs 22 to the sheet 15'. Owing to the fact that the adjacent or mating surfaces of the discs are of fabric material, it follows that these surfaces of the discs do not adhere to one another. Upon completion of the vulcanizing operation, the subassembly is subjected to a suitable die cutting operation to form the window openings through the subassembly. Inasmuch as the window openings are of less diameter than the discs and in view of the fact that these openings are formed through the center of the discs, it follows that an annular pocket 17 is formed around each window opening with a lining of absorbent material.

Upon completion of the die cutting operation, the appropriate solvent is applied to the linings 19. The pockets are then in condition to receive the peripheral edge portions of the windows or discs 12 and the diameter of the latter is such as to enable the peripheral portions thereof to extend for a substantial distance into the pockets. Owing to the nature of the material from which the discs 12 are formed, the peripheral portions of the discs dissolve to some extent under the influence of the solvent and permeate the absorbent linings of the pockets. This action is facilitated by the application of opposing pressures to the opposite side walls of the pockets. This pressure is controlled so as not to displace either the solvent or the softened peripheral portion of the discs from the pockets. Particularly satisfactory results have been secured by using pressures of approximately twenty pounds per square inch, although this pressure is not critical and may vary considerably.

After the assembly resulting from the above is permitted to dry or set for an appropriate time period, the sheet 13' is cut to proper size and shape to form the sheet 13 of the completed gas mask. In addition, the chin portion 25 of the gas mask is spliced and shaped to the contour illustrated in Figure 1.

As a result of the foregoing, a gas mask is provided wherein the peripheral edge portions of both windows are integrally joined or connected throughout their circumference with the body portion of the mask in such a manner as to obtain in effect a double hermetic seal around each of the windows. It will also be noted that the above feature is obtained without the assistance of mechanical clamping devices or their equivalents and, therefore, the masks may be expediently manufactured and assembled. In addition, the nature of the integral joint between the peripheral portions of the windows and the mask is such as to withstand considerable stress without the danger of developing a leak.

While in describing the foregoing particular stress has been placed on bonding the plastic material to the opposed walls of a pocket or channel formed in the body member, nevertheless, it is evident that under some conditions the pocket or channel may be omitted. In the event the pocket or channel is omitted, the absorbent material is secured to one side of the body member and the plastic material is bonded to the absorbent surface in the same manner described above in connection with the pockets. Such an arrangement may be used in cases where a double seal is not essential and where the construction is not subjected to high stresses. Therefore, reservation is made to make such changes in the details of construction and method of manufacture as may come within the purview of the accompanying claim.

What I claim as my invention is:

The method of forming a composite article comprising placing two superimposed members of absorbent material between superimposed sheets of vulcanizable material, vulcanizing the sheets while holding adjacent surfaces in contact to secure the sheets together and to the adjacent surfaces of the members, forming an opening through the sheets and members to provide a pocket around the opening with absorbent linings on opposed walls thereof, applying a solvent to the linings, inserting into the pocket the outer edge portion of a closure comprising a material which is soluble in the solvent solution and becomes tacky when softened, and forcing the opposed linings into intimate contact with the adjacent portion of the closure to impregnate the linings with the softened material from the closure.

EDMUND J. FIEKERS.